United States Patent
Deville et al.

(10) Patent No.: US 11,492,531 B1
(45) Date of Patent: Nov. 8, 2022

(54) SAND CONSOLIDATION WITH A CURABLE RESIN AND FILTERCAKE REMOVAL FLUID

(71) Applicant: Halliburton Energy Services, Inc., Houston, TX (US)

(72) Inventors: Jay Deville, Houston, TX (US); Philip Nguyen, Houston, TX (US); Weibin Zha, Houston, TX (US); Michael Sanders, Houston, TX (US)

(*) Notice: Subject to any disclaimer, the term of this patent is extended or adjusted under 35 U.S.C. 154(b) by 0 days.

(21) Appl. No.: 17/450,624

(22) Filed: Oct. 12, 2021

(51) Int. Cl.
*E21B 43/02* (2006.01)
*C09K 8/035* (2006.01)

(52) U.S. Cl.
CPC ............ *C09K 8/035* (2013.01); *E21B 43/025* (2013.01)

(58) Field of Classification Search
CPC ............................... C09K 8/035; E21B 43/025
See application file for complete search history.

(56) References Cited

U.S. PATENT DOCUMENTS

| | | | |
|---|---|---|---|
| 4,427,069 A | 1/1984 | Friedman | |
| 4,842,072 A | 6/1989 | Friedman et al. | |
| 5,005,648 A | 4/1991 | Friedman et al. | |
| 5,284,206 A | 2/1994 | Surles et al. | |
| 6,702,021 B1* | 3/2004 | Nguyen | C09K 8/24 507/216 |
| 6,981,560 B2 | 1/2006 | Nguyen et al. | |
| 7,104,325 B2 | 9/2006 | Nguyen et al. | |
| 7,108,083 B2 | 9/2006 | Simonds et al. | |
| 7,766,099 B2 | 8/2010 | Nguyen | |
| 7,926,591 B2 | 4/2011 | Nguyen et al. | |
| 2004/0055747 A1* | 3/2004 | Lee | C09K 8/52 507/260 |
| 2004/0149431 A1* | 8/2004 | Wylie | E21B 43/103 175/57 |
| 2005/0051330 A1* | 3/2005 | Nguyen | C09K 8/88 507/903 |
| 2007/0017675 A1* | 1/2007 | Hammami | E21B 43/086 166/278 |

* cited by examiner

*Primary Examiner* — Silvana C Runyan
(74) *Attorney, Agent, or Firm* — Sheri Higgins Law, PLLC; Sheri Higgins

(57) ABSTRACT

Sand consolidation for a subterranean formation can be achieved by adding a curable resin to a drilling fluid. The curable resin can be a furan- or epoxy- or silane-based resin. The drilling fluid can form a filtercake on a wellbore wall. A filtercake-removal fluid can provide a dual function to remove the filtercake and cure the curable resin, which consolidates formation particles. A curing agent can also be included in the filtercake-removal fluid. Sand consolidation can also be achieved by adding the curable resin to the filtercake-removal fluid. The resin can penetrate into the formation as the filtercake is being removed and then cure.

20 Claims, No Drawings

SAND CONSOLIDATION WITH A CURABLE RESIN AND FILTERCAKE REMOVAL FLUID

TECHNICAL FIELD

Sand-control operations can be performed in wellbores. A curable resin used for sand consolidation can be included in a drilling fluid or in a filtercake removal fluid. A curing agent can be included in the filtercake removal fluid or after the filtercake removal fluid.

DETAILED DESCRIPTION

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase, whereas a heterogeneous fluid has more than one distinct phase. A colloid is an example of a heterogeneous fluid. A heterogeneous fluid can be a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to, the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During drilling operations, a wellbore is formed using a drill bit. A drill string can be used to convey the drill bit in drilling through a subterranean formation to form the wellbore. The drill string can include a drilling pipe through which a drilling fluid or drilling mud is pumped. The wellbore defines a wellbore wall, which is the exposed portion of the subterranean formation where the wellbore was formed. The drilling fluid may be circulated downwardly through the drilling pipe and back up the annulus between the wellbore wall and the outside of the drilling pipe.

It is common to deposit a filtercake in a portion of a well. A filtercake is the residue deposited on a permeable medium of the subterranean formation when a slurry, such as a drilling fluid, is forced against the medium under pressure. The filtrate is the liquid that passes through the medium, leaving the cake on the medium. In filtercake deposition, the slurry, which commonly includes water, a gelling agent, calcium carbonate, and polymers, is introduced into the open-hole wellbore. The fluid flows into a desired portion of the well, and the ingredients in the fluid form the filtercake during drilling operations. The filtercake can be used to bind fines, such as sand, together; can reduce damage to formation permeability; and can also stabilize the wellbore.

It is often desirable to remove at least a portion of a filtercake at some stage in the production process. The filtercake is often removed in order to restore fluid flow between the wellbore and the subterranean formation during production of oil, gas, and/or water and/or injection of fluids in an injector well and/or fluids flowing from one part of the reservoir to another part of the reservoir (termed crossflow). The filtercake can be removed by introducing a filtercake-removal fluid into the portion of the wellbore containing the filtercake. The filtercake-removal fluid includes ingredients that can chemically react with some of the ingredients in the filtercake, causing those ingredients to solubilize, and thus causing the filtercake to be removed from the wall of the wellbore.

However, subterranean formation sand and fines can be produced along with the oil, gas, and/or water from a reservoir. These formation particles can damage wellbore equipment as well as surface equipment. There are primary and remedial wellbore operations that can be used to stop the movement of the solids from the formation into the wellbore. Examples of operations that stop formation particles from entering the wellbore include resin-consolidation treatments, which consolidate particles together to form a consolidated pack of particles; and gravel packing or frac packing, which filter out formation particles using a graded sand that is controlled via a screen installed in the wellbore. Combinations of resins and sand can be used to create a stable interface between the formation sand and the wellbore. The systems described above are commonly called sand-control completions. In gravel-pack operations (one form of a sand-control completion), a sand screen is placed in the wellbore and the surrounding annulus is packed with prepared gravel of a specific size designed to prevent the passage of formation sand into the production tubing string. Sand screens can also be used independently of gravel-packing operations. However, installation of a sand screen and gravel-packing operations can be time consuming and increase the cost of wellbore operations.

Sand-control operations can also involve pumping a resin or a tackifying agent into the wellbore after the filtercake has been removed. The resin can be cured or hardened such that the cured resin binds formation sand or fines together to prevent migration of formation sand into a tubing string during production operations. This process can involve several fluids that are introduced into the wellbore at different times. However, there are several problems that can arise during the operation. For example, it is difficult for the resin to penetrate a desired depth into the subterranean formation when the filtercake is present because the filtercake may not have a sufficient permeability to allow the resin or curing agent to flow past the filtercake. Another example is adequate consolidation may be prevented if the filtercake is removed first because there is nothing to bind formation fines together or to stabilize the wellbore wall. Another example is the increased costs associated with pumping multiple fluids within the wellbore at different stages of the operation.

Thus, there is a need to provide improved sand-consolidation techniques. It has been discovered that a curable resin can be introduced into a wellbore with a drilling fluid or with a filtercake-removal fluid. A curing agent can be introduced into the wellbore with the filtercake-removal fluid or after the filtercake-removal fluid. The methods can provide enhanced sand-control capabilities, achieve improved penetration into the subterranean formation, eliminate the need for gravel packing, and simplify the sand-control operation.

A method of treating a subterranean formation can include forming a wellbore that penetrates the subterranean formation with a drilling fluid, wherein the drilling fluid comprises a curable resin; and introducing a filtercake-removal fluid into the wellbore, wherein the filtercake-removal fluid removes the filtercake and cures the curable resin.

A method of treating a subterranean formation can also include forming a wellbore that penetrates the subterranean formation with a drilling fluid; and introducing a filtercake-removal fluid into the wellbore, wherein the filtercake-removal fluid comprises a curable resin, and wherein the filtercake-removal fluid removes the filtercake and cures the curable resin.

The various disclosed embodiments can apply to all of the methods. As used herein, any reference to the unit "gallons" means U.S. gallons.

The drilling fluid can be a colloid, an emulsion, or an invert emulsion. The drilling fluid can include a base fluid. The base fluid can include dissolved materials or undissolved solids. The base fluid can include a hydrocarbon liquid, or an internal phase of the drilling fluid can include a hydrocarbon liquid. The hydrocarbon liquid can be selected from the group consisting of a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin.

The base fluid or an internal phase of the drilling fluid can comprise water. The water can be selected from the group consisting of freshwater, seawater, brine, and any combination thereof in any proportion. The drilling fluid can further include a water-soluble salt. Preferably, the salt is selected from the group consisting of sodium chloride, calcium chloride, calcium bromide, potassium chloride, potassium bromide, magnesium chloride, sodium formate, potassium formate, cesium formate, and any combination thereof. The drilling fluid can contain the water-soluble salt in a concentration in the range of about 35 to about 90 pounds per barrel (ppb) (348 kilograms per cubic meter "$kg/m^3$") of the water.

The drilling fluid can also include one or more additives. The drilling fluid can include a surfactant, an emulsifier, a viscosifier, a viscosity-reducing agent or thinner, a weighting agent, a fluid-loss additive, a friction reducer, or a lost-circulation material.

The drilling fluid can form a filtercake in a portion of the wellbore. The drilling fluid can form a filtercake on the wall of the wellbore. The drilling fluid can also form a filtercake a certain distance into the subterranean formation from the wellbore, such as a few feet into any pores of the subterranean formation. In this manner, the filtercake that is formed is not restricted to just the wall of the wellbore, but, rather, can penetrate a certain distance into the subterranean formation.

According to any of the embodiments, the drilling fluid also includes a curable resin. The curable resin can be selected from furan-based resins or epoxy- or silane-based resins. Furan is a heterocyclic organic compound consisting of a five-membered aromatic ring with four carbon atoms and one oxygen atom. The furan-based resin can be selected from the group consisting of furfuryl alcohol resins, furfural resins, combinations of furfuryl alcohol resins and aldehydes, or a combination of furan resins and phenolic resins.

The epoxy-based resin can be an epoxy, diepoxy, or polyepoxy resin. As used herein, an epoxy resin is a compound that contains one epoxide functional group, a diepoxy resin is a compound containing two epoxide functional groups, and a polyepoxy resin is a compound that contains three or more epoxide functional groups. Epoxy, diepoxy, and polyepoxy resins are a class of reactive pre-polymers and polymers that contain epoxide groups. An epoxide is a cyclic ether with a three-atom ring that approximates an equilateral triangle, thus making the epoxide more reactive compared to other ethers. As such, the curable resin can be polymer molecules. If the curable resin is a pre-polymer, then the curable resin can form a polymer before, during, or after introduction into the wellbore. The epoxy- or silane-based resin can be selected from the group consisting of organic resins, such as bisphenol A glycidyldiepoxy, glycidyl propyltrimethoxysilane, bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, urethane resins, glycidyl ether resins, other epoxy resins, and combinations thereof.

The curable resin can be any compound that is capable of curing (i.e., the process of gaining compressive strength and becoming hard). The curable resin can cure via a chemical reaction with a curing compound. The curable resin can have an affinity for the particles of the subterranean formation. In this manner, the curable resin can be attracted to the particles. The curable resin can also coat the particles prior to curing. The curable resin can also chemically bond with the surfaces of the particles.

According to any of the embodiments, the curable resin is included in the drilling fluid. Filtercake formation from the drilling fluid may not occur immediately when the drilling fluid encounters the subterranean formation. The curable resin can thus be able to penetrate a desired depth into the subterranean formation. The filtercake can form on the wall of the wellbore after the curable resin has penetrated the desired depth into the formation. The drilling fluid can include additives, such as bridging agents (e.g., calcium carbonate), weighting agents (e.g., barite, silica, or hematite), or pore filling materials (e.g., starch, etc.), in order to optimize fluid loss. Optimizing the drilling fluid can accentuate losses into the formation to allow the curable resin to penetrate a desired depth into the formation. Other additives, such as hollow glass spheres and nanocellulose, can facilitate the desired fluid loss. In this manner, improved sand control of the formation can be achieved.

The methods include introducing a filtercake-removal fluid into the wellbore formed from the drilling fluid and drilling equipment. The filtercake-removal fluid removes the filtercake and cures the curable resin. The filtercake-removal fluid can include a base fluid. The base fluid can include water. The base fluid can also include a hydrocarbon liquid and soluble or insoluble compounds.

According to the furan-based resin embodiments, the filtercake-removal fluid comprises an acid, a delayed acid, or combinations thereof. The filtercake that is formed can be degraded by the acid. For example, some or all of the ingredients that make up the filtercake can be acid soluble. In this manner, some or all of the filtercake can be degraded (including dissolved or broken down molecularly into smaller fragments) such that the degraded filtercake can be removed from the subterranean formation via the wellbore. The acid can degrade a substantial portion or all of the filtercake such that the permeability of the subterranean formation is restored to a pre-filtercake state.

It may be desirable to use a delayed acid to allow the filtercake-removal fluid to be introduced into the desired portion of the wellbore for filtercake removal. A delayed acid can include the introduction of an acid precursor into the wellbore. As used herein, an "acid precursor" is a moiety (e.g., a salt or an ester) that forms an acid in the presence of water. The acid precursor hydrolyzes when in contact with a water-based wellbore fluid to form an acid. The acid can then break down and remove the filtercake. The release of the acid from the precursor can be slow, depending upon temperature. This slow release of the acid can allow the filtercake-removal fluid to be introduced into the desired portion of the well to be treated.

The acid can cure the furan-based curable resin. In this manner, the filtercake-removal fluid provides a dual function to remove the filtercake and cure the curable resin without additional ingredients being required. The acid can be selected from organic or inorganic acids, including, but not limited to, maleic acid, fumaric acid, sodium bisulfate, hydrochloric acid, hydrofluoric acid, acetic acid, formic acid, lactic acid, phosphoric acid, sulfonic acid, alkyl benzene sulfonic acids such as toluene sulfonic acid and dodecyl benzene sulfonic acid ("DDBSA"), acid precursors of any of the foregoing, and combinations thereof.

Below is an example reaction for a furan-based resin of furfuryl alcohol cured by an acid.

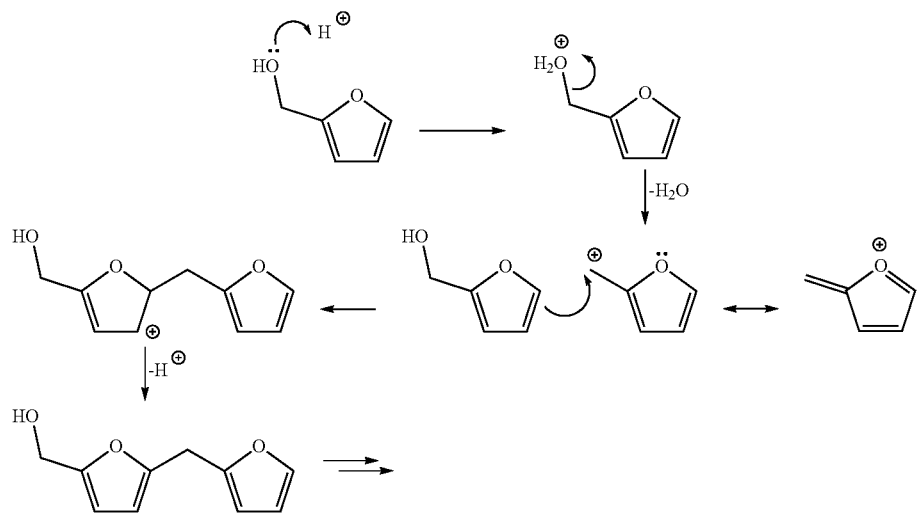

According to the epoxy- or silane-based curable resins, the filtercake-removal fluid can comprise a delayed acid or have a pH greater than or equal to 6. The filtercake-removal fluid can further include a curing agent for the epoxy- or silane-based curable resin. The curing agent can be selected from cyclo-aliphatic amines, such as piperazine, derivatives of piperazine (e. g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; 2-ethyl-4-methyl imidazole; and combinations thereof. These embodiments can be useful when the filtercake-removal fluid includes a delayed acid. In this manner, the acid formed from the delayed acid can remove the filtercake and the curing agent can cause the epoxy- or silane-based curable resin to cure. The curing agent can also crosslink the epoxy- or silane-based curable resins. Another fluid can also be introduced into the wellbore after the filtercake-removal fluid. According to these embodiments, the epoxy- or silane-based curable resins can be partially cured by a first curing agent included in the filtercake-removal fluid and the other fluid can include a second curing agent that fully cures the curable resin.

According to the embodiments for the epoxy- or silane-based curable resins and wherein the filtercake-removal fluid does not include an acid or delayed acid, the filtercake-removal fluid can be a caustic fluid having a pH greater than or equal to 6. The caustic fluid can include one or more chelating agents, for example ethylenediaminetetraacetic acid (EDTA) or N,N-dicarboxymethyl glutamic acid tetrasodium salt (GLDA), that can remove the filtercake and cure the curable resin. In this manner, the filtercake-removal fluid provides a dual function to remove the filtercake and cure the epoxy- or silane-based curable resin without additional ingredients being required.

The methods can also include wherein the filtercake-removal fluid comprises the curable resin, and wherein the filtercake-removal fluid removes the filtercake and cures the curable resin. According to these embodiments, the drilling fluid can also include the same or a different curable resin or does not include the curable resin.

In addition to the curable resin, the filtercake-removal fluid can include an acid or delayed acid as discussed above and can optionally include a curing agent for the epoxy- or silane-based curable resins. The filtercake-removal fluid can be a caustic fluid having a pH greater than or equal to 6 for the epoxy- or silane-based resins. In this manner, the filtercake-removal fluid can begin removing the filtercake, allow the curable resin to penetrate the desired depth into the formation, and cure the resin for sand consolidation. A catalyst can be included in the filtercake-removal fluid to speed up the curing of the curable resin. The filtercake-removal fluid can also exclude a catalyst, for example for epoxy- or silane-based curable resins. These embodiments can not only decrease the number of different stages or fluids to be pumped into the wellbore but can also greatly improve consolidation of formation particles.

The curable resin can be included in the drilling fluid or the filtercake-removal fluid in a concentration in the range of 0.1% to 25% volume by volume (v/v) of the drilling or filtercake-removal fluid, or 1% to 10% v/v. If a curing agent is included in the filtercake-removal fluid, then the curing agent can be in a concentration in the range of 0.1% to 25% v/v of the filtercake-removal fluid, or 1% to 10% v/v.

A sand screen can be installed in the wellbore. According to any of the embodiments, a sand screen is not installed in the wellbore. According to any of the embodiments, a gravel-packing operation is not performed. A sand screen and gravel-packing operation may not be needed because sand control can be accomplished via chemical means instead of mechanical means.

An embodiment of the present disclosure is a method of treating a subterranean formation comprising: forming a wellbore that penetrates the subterranean formation with a drilling fluid and drilling equipment, wherein the drilling fluid comprises a curable resin; and introducing a filtercake-removal fluid into the wellbore, wherein the filtercake-removal fluid removes a filtercake formed from the drilling fluid and cures the curable resin. Optionally, the method further comprises wherein the curable resin is a furan-based resin, and wherein the furan-based resin is selected from the group consisting of furfuryl alcohol resins, furfural resins, combinations of furfuryl alcohol resins and aldehydes, or a combination of furan resins and phenolic resins. Optionally, the method further comprises wherein the filtercake-removal fluid comprises an acid, a delayed acid, or combinations thereof. Optionally, the method further comprises wherein the acid is selected from organic or inorganic acids selected from maleic acid, fumaric acid, sodium bisulfate, hydrochloric acid, hydrofluoric acid, acetic acid, formic acid, lactic acid, phosphoric acid, sulfonic acid, alkyl benzene sulfonic acids, acid precursors of any of the foregoing, and combinations thereof. Optionally, the method further comprises wherein the curable resin is an epoxy-based resin or a silane-based resin, and wherein the epoxy- or silane-based resin is selected from the group consisting of organic resins selected from bisphenol A glycidyldiepoxy, glycidyl propyltrimethoxysilane, bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, urethane resins, glycidyl ether resins, other epoxide resins, and combinations thereof. Optionally, the method further comprises wherein the filtercake-removal fluid comprises an acid, delayed acid, or combinations thereof and further comprises a curing agent. Optionally, the method further comprises wherein the curing agent is selected from cyclo-aliphatic amines selected from piperazine, derivatives of piperazine, and modified piperazines; aromatic amines selected from methylene dianiline, derivatives of methylene dianiline and hydrogenated forms, and 4,4'-diaminodiphenyl sulfone; aliphatic amines selected from ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; 2-ethyl-4-methyl imidazole; and combinations thereof. Optionally, the method further comprises wherein the filtercake-removal fluid is a caustic fluid having a pH greater than or equal to 6. Optionally, the method further comprises wherein the drilling fluid further comprises additives that optimize fluid loss selected from bridging agents, weighting agents, pore filling materials, hollow glass spheres, nanocellulose, and combinations thereof. Optionally, the method further comprises wherein the filtercake is formed on a wall of the wellbore after the curable resin has penetrated a desired depth into the subterranean formation.

Another embodiment of the present disclosure is a method of treating a subterranean formation comprising: forming a wellbore that penetrates the subterranean formation with a drilling fluid and drilling equipment; and introducing a filtercake-removal fluid into the wellbore, wherein the filtercake-removal fluid comprises a curable resin, and wherein the filtercake-removal fluid removes a filtercake formed from the drilling fluid and cures the curable resin. Optionally, the method further comprises wherein the curable resin is a furan-based resin, and wherein the furan-based resin is selected from the group consisting of furfuryl alcohol resins, furfural resins, combinations of furfuryl alcohol resins and aldehydes, or a combination of furan resins and phenolic resins. Optionally, the method further comprises wherein the filtercake-removal fluid comprises an acid, a delayed acid, or combinations thereof. Optionally, the method further comprises wherein the acid is selected from organic or inorganic acids selected from maleic acid, fumaric acid, sodium bisulfate, hydrochloric acid, hydrofluoric acid, acetic acid, formic acid, lactic acid, phosphoric acid, sulfonic acid, alkyl benzene sulfonic acids, acid precursors of any of the foregoing, and combinations thereof. Optionally, the method further comprises wherein the curable resin is an epoxy-based resin or a silane-based resin, and wherein the epoxy- or silane-based resin is selected from the group consisting of organic resins selected from bisphenol A glycidyldiepoxy, glycidyl propyltrimethoxysilane, bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, urethane resins, glycidyl ether resins, other epoxide resins, and combinations thereof. Optionally, the method further comprises wherein the filtercake-removal fluid comprises an acid, delayed acid, or combinations thereof and further comprises a curing agent. Optionally, the method further comprises wherein the curing agent is selected from cyclo-aliphatic amines selected from piperazine, derivatives of piperazine, and modified piperazines; aromatic amines selected from methylene dianiline, derivatives of methylene dianiline and hydrogenated forms, and 4,4'-diaminodiphenyl sulfone; aliphatic amines selected from ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; 2-ethyl-4-methyl imidazole; and combinations thereof. Optionally, the method further comprises wherein the filtercake-removal fluid is a caustic fluid having a pH greater than or equal to 6. Optionally, the method further comprises wherein the curable resin is in a concentration in the range of 0.1% to 25% volume by volume of the filtercake-removal fluid. Optionally, the method further comprises wherein the curing agent is in a concentration in the range of 0.1% to 25% v/v of the filtercake-removal fluid.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole, such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives, such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more fluids, etc., as the case may be, and do not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method of treating a subterranean formation comprising:
    forming a wellbore that penetrates the subterranean formation with a first fluid and drilling equipment, wherein the first fluid is a drilling fluid, and wherein the drilling fluid comprises a curable resin; and then
    introducing a second fluid into the wellbore, wherein the second fluid is a filtercake-removal fluid, and wherein the filtercake-removal fluid removes a filtercake formed from the drilling fluid and cures the curable resin.

2. The method according to claim 1, wherein the curable resin is a furan-based resin, and wherein the furan-based resin is selected from the group consisting of furfuryl alcohol resins, furfural resins, combinations of furfuryl alcohol resins and aldehydes, or a combination of furan resins and phenolic resins.

3. The method according to claim 2, wherein the filtercake-removal fluid comprises an acid, a delayed acid, or combinations thereof.

4. The method according to claim 3, wherein the acid is selected from organic or inorganic acids selected from maleic acid, fumaric acid, sodium bisulfate, hydrochloric acid, hydrofluoric acid, acetic acid, formic acid, lactic acid, phosphoric acid, sulfonic acid, alkyl benzene sulfonic acids, acid precursors of any of the foregoing, and combinations thereof.

5. The method according to claim 1, wherein the drilling fluid further comprises additives that optimize fluid loss selected from bridging agents, weighting agents, pore filling materials, hollow glass spheres, nanocellulose, and combinations thereof.

6. The method according to claim 1, wherein the filtercake is formed on a wall of the wellbore after the curable resin has penetrated a desired depth into the subterranean formation.

7. The method according to claim 1, wherein the filtercake-removal fluid comprises a base fluid.

8. The method according to claim 7, wherein the base fluid of the filtercake-removal fluid comprises water.

9. The method according to claim 1, wherein the curable resin is in a concentration in the range of 0.1% to 25% volume by volume of the drilling fluid.

10. The method according to claim 1, wherein the curable resin is an epoxy-based resin or a silane-based resin, and wherein the epoxy or silane-based resin is selected from the group consisting of organic resins selected from bisphenol A glycidyl diepoxy, glycidyl propyl trimethoxy silane, bisphenol A diglycidyl ether resins, butoxy methyl butyl glycidyl ether resins, bisphenol A-epichlorohydrin resins, bisphenol F resins, polyepoxide resins, novolak resins, polyester resins, phenol-aldehyde resins, urea-aldehyde resins, urethane resins, glycidyl ether resins, other epoxy resins, and combinations thereof.

11. The method according to claim 10, wherein the filtercake-removal fluid comprises an acid, delayed acid, or combinations thereof and further comprises a curing agent.

12. The method according to claim 11, wherein the curing agent is selected from cyclo-aliphatic amines selected from piperazine, derivatives of piperazine, and modified piperazines; aromatic amines selected from methylene dianiline, derivatives of methylene dianiline and hydrogenated forms, and 4,4'-diaminodiphenyl sulfone; aliphatic amines selected from ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; 2-ethyl-4-methyl imidazole; and combinations thereof.

13. The method according to claim 11, wherein then the curing agent is in a concentration in the range of 0.1% to 25% volume by volume of the filtercake-removal fluid.

14. The method according to claim 10, wherein the filtercake-removal fluid is a caustic fluid having a pH greater than or equal to 6.

15. The method according to claim 14, wherein the caustic fluid comprises one or more chelating agents.

16. The method according to claim 15, wherein the one or more chelating agents are selected from the group consisting of ethylenediaminetetraacetic acid, N,N-dicarboxymethyl glutamic acid tetrasodium salt, and combinations thereof.

17. The method according to claim 1, wherein the drilling fluid further comprises a base fluid.

18. The method according to claim 17, wherein the base fluid of the drilling fluid comprises water.

19. The method according to claim 17, wherein the base fluid of the drilling fluid comprises a hydrocarbon liquid.

20. The method according to claim 19, wherein the hydrocarbon liquid is selected from the group consisting of a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

\* \* \* \* \*